US008539485B2

(12) United States Patent
Snyder et al.

(10) Patent No.: US 8,539,485 B2
(45) Date of Patent: Sep. 17, 2013

(54) POLLING USING RESERVATION MECHANISM

(75) Inventors: Michael D. Snyder, Cedar Park, TX (US); Gary L. Whisenhunt, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 1333 days.

(21) Appl. No.: 11/942,813

(22) Filed: Nov. 20, 2007

(65) Prior Publication Data

US 2009/0132796 A1  May 21, 2009

(51) Int. Cl.
G06F 9/46 (2006.01)
G06F 12/00 (2006.01)
G06F 13/00 (2006.01)
G06F 3/00 (2006.01)
G06F 13/22 (2006.01)

(52) U.S. Cl.
USPC ........... 718/100; 711/118; 711/141; 711/152; 710/44; 710/45; 710/46; 710/47; 710/109; 710/220

(58) Field of Classification Search
None
See application file for complete search history.

(56) References Cited

U.S. PATENT DOCUMENTS

| 5,845,103 A * | 12/1998 | Sodani et al. ................. 712/216 |
| 6,073,211 A | 6/2000 | Cheng et al. |
| 6,615,323 B1 * | 9/2003 | Petersen et al. ............... 711/146 |
| 7,234,139 B1 * | 6/2007 | Feinberg ........................... 718/1 |
| 7,493,621 B2 * | 2/2009 | Bradford et al. .............. 718/108 |
| 7,581,067 B2 * | 8/2009 | Johns ............................ 711/144 |
| 7,600,076 B2 * | 10/2009 | Johns ............................ 711/118 |
| 7,797,706 B2 * | 9/2010 | Browning et al. ............. 718/107 |
| 7,962,900 B2 * | 6/2011 | Barraclough et al. ........ 717/128 |
| 2006/0136919 A1 * | 6/2006 | Aingaran et al. ............. 718/100 |
| 2006/0179244 A1 * | 8/2006 | Goodman et al. ............. 711/141 |
| 2006/0288173 A1 * | 12/2006 | Shen ............................. 711/141 |
| 2007/0169125 A1 * | 7/2007 | Qin ............................... 718/102 |
| 2009/0271790 A1 * | 10/2009 | Williams ...................... 718/100 |

FOREIGN PATENT DOCUMENTS

WO  00/68780 A2  11/2000

* cited by examiner

*Primary Examiner* — Emerson Puente
*Assistant Examiner* — Adam Lee (57) ABSTRACT

A first thread enters a polling loop to wait for a signal from a second thread before processing instructions dependent on the polling loop. When entering the polling loop, the first thread sets a reservation for a predetermined memory address. The first thread then executes a reservation-based instruction that can change the execution state of the first thread. Reservation circuitry of the processing device that was executing the first thread monitors the reservation. In the event that the reservation cleared, such as by the second thread modifying data at the predetermined memory address, the first thread is reinstated to its prior execution state. By using a hardware reservation mechanism to monitor for clearing of a set reservation, repeated memory accesses to the memory address by the first thread can be minimized or avoided while in the polling loop and other threads can be allowed to execute at the processing device with reduced interference from the waiting thread.

17 Claims, 4 Drawing Sheets

POLLING USING RESERVATION MECHANISM

FIELD OF THE DISCLOSURE

The present disclosure relates generally to processing devices and more particularly to polling in processing devices.

BACKGROUND

Signaling between threads, whether on the same processing device or on different processing devices, often is achieved via the modification of a value stored at a predetermined memory address of a memory accessible to the threads. One common implementation includes software-based polling whereby one thread enters a software polling loop to wait until a predetermined value is stored at the memory address by another thread. This polling loop typically entails repeated memory accesses to reload the value stored at the memory address at the time of the memory access to determine whether it has been modified. These frequent memory accesses increase traffic on the memory bus and therefore can limit the overall bandwidth of the memory for other processes. Further, a processing device is engaged in repeatedly executing the instructions representing the polling loop, thereby limiting the processing bandwidth available to other threads associated with the processing device. Accordingly, an improved technique for polling-based signaling between threads would be advantageous.

BRIEF DESCRIPTION OF THE DRAWINGS

The present disclosure may be better understood and its numerous features and advantages made apparent to those skilled in the art by referencing the accompanying drawings. The use of the same reference symbols in different drawings indicates similar or identical items.

DETAILED DESCRIPTION

In accordance with one aspect of the present disclosure, a method includes setting, at a processing device, a reservation associated with a memory address and executing an instruction of a thread at the processing device to change an execution state of the thread from a first execution state to a second execution state and to maintain the second execution state at the processing device until an invalidation of the reservation is determined by reservation circuitry of the processing device. The method further includes changing the execution state of the thread from the second execution state to the first execution state at the processing device in response to the reservation circuitry determining the invalidation of the reservation.

In accordance with another aspect of the present disclosure, a system includes a processing device. The processing device includes an execution unit to execute an instruction of a thread to change an execution state of the thread from a first execution state to a second execution state and to maintain the second execution state at the processing device until a reservation indicator is configured to a predetermined state. The processing device further includes reservation circuitry to configure the reservation indicator to the predetermined state in response to an invalidation of a reservation associated with memory address.

In accordance with yet another aspect of the present disclosure, a computer readable medium embodies a set of executable instructions to manipulate a processing device. The set of executable instructions includes an instruction configured to manipulate the processing device to change an execution state of a thread associated with the first instruction from a first execution state to a second execution state and to maintain the second execution state at the first processing device until an invalidation of a reservation is detected by the processing device.

FIGS. 1-4 illustrate example techniques for hardware-based inter-thread signaling using a reservation mechanism. In at least one embodiment, a first thread enters a polling loop to wait for a signal from a second thread before processing instructions dependent on the polling cycle, whereby the signal from the second thread can include the storing of a predetermined signal value to a predetermined memory address of a memory accessible to both threads. When entering the polling loop, the first thread sets a reservation for the predetermined memory address. The first thread then executes a reservation-based instruction that changes the execution state of the first thread, either by disabling execution of the first thread or by deprioritizing the first thread so that another thread may be chosen for execution based on relative thread execution priorities. While the first thread is in the changed execution state (disabled/deprioritized), reservation circuitry of the processing device that was executing the first thread monitors the reservation to determine whether it has been cleared. Further, a coherency agent of the processing device monitors, or snoops, memory-based traffic from other threads to determine whether another thread has modified the value at the predetermined memory address. In the event that a modification is detected, thereby invalidating the reservation, or if the reservation is otherwise invalidated (e.g., via an interrupt, execution of a store-conditional instruction, etc.), the first thread is reinstated to its prior execution state. In instances whereby the modification of the data at the memory address is the cause of the invalidation of the reservation, the modified value of the predetermined memory address can be loaded from the memory address or obtained from the snooped memory transaction. In the event that the modified value equals the predetermined signal value, the first thread continues on to processing instructions dependent on the polling loop. Otherwise, if the modified value is not equal to the predetermined signal value, the first thread sets the reservation again and then executes the reservation-based instruction to disable or prioritize the first thread until the next detected modification of the predetermined memory address. By using a conventional hardware reservation mechanism to monitor for clearing of a set reservation, which frequently occurs due to a modification to the memory address, repeated memory accesses to the memory address can be minimized or avoided while in the polling loop, as well as allowing other threads to execute at the processing device with minimal interference from the waiting thread while the reservation remains set (e.g., another thread has not signaled the waiting thread via modification of the memory address).

For ease of discussion, the example techniques disclosed herein are described in the context of inter-thread signaling between threads on different processing devices. However, these techniques similarly may be implemented for inter-thread signaling between threads executed by the same processing device without departing from the scope of the present disclosure. Further, the techniques are described in a context whereby the predetermined memory address through which threads are signaled maps to a location of a memory. However, the predetermined memory address used for reservation instead may be associated with a memory-mapped register or other storage element of a peripheral device or other mutually-accessible component.

Although the example techniques are described herein in the context of clearing, or invalidating, a reservation set by one thread via a modification of a reserved memory address by another thread, it will be appreciated that other events, such as an interrupt or execution of a store-conditional instruction, may have the effect of clearing a set reservation. These other events may not serve as an actual signal from one thread to the thread that has set the reservation and is monitoring the reservation but will still cause the thread to temporarily exit its reservation-based polling loop. However, the additional processing needed by the thread monitoring the reservation to verify the cause of the clearing of the reservation in such instances typically will not significantly affect the efficiency of the reservation-based polling techniques due to the relative infrequency of events that can clear a reservation that are not based on modification of the data at the reserved memory address.

Figure 1:
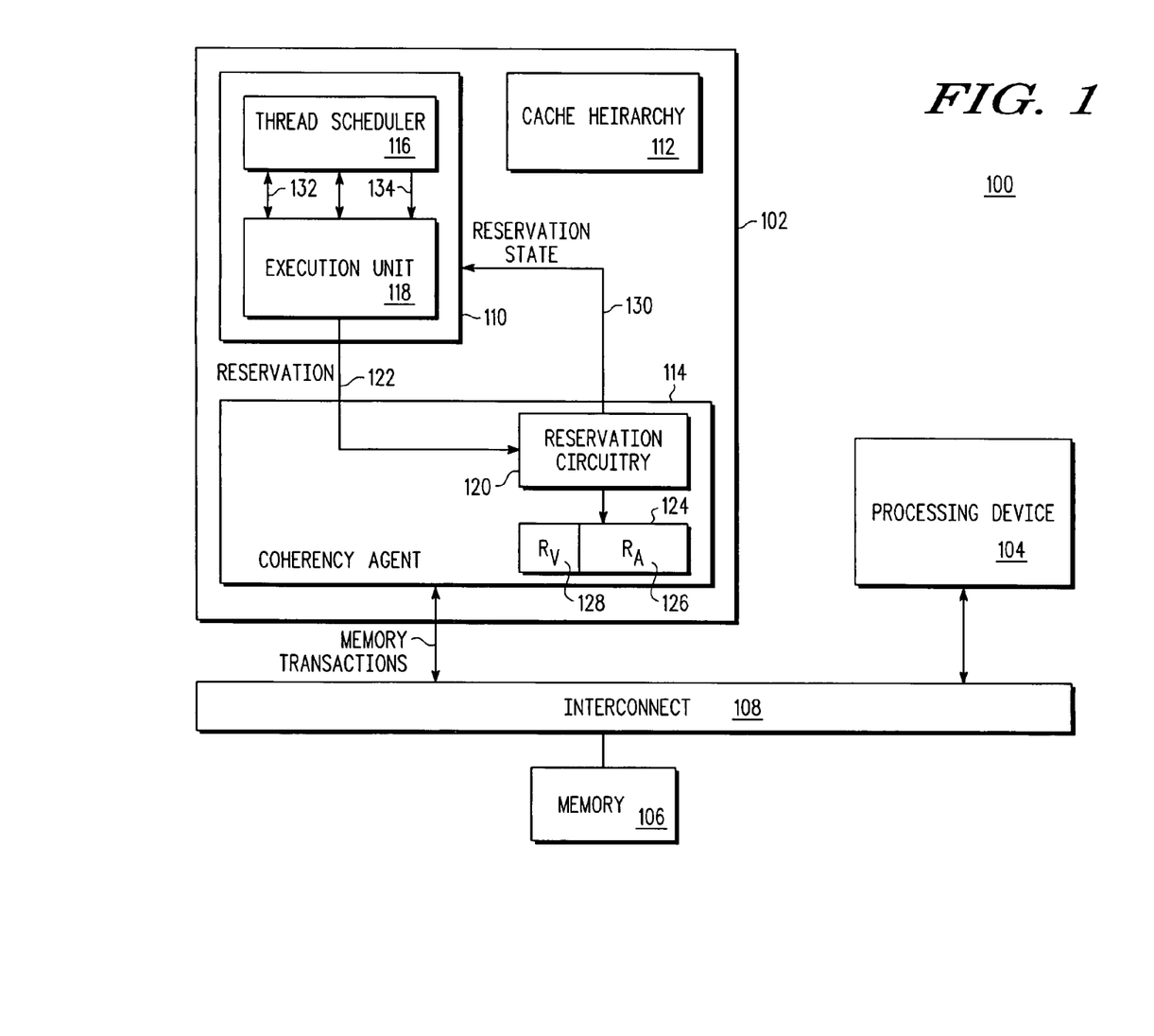
FIG. 1 is a block diagram illustrating a processing system utilizing a reservation mechanism to implement polling for inter-thread signaling in accordance with at least one embodiment of the present disclosure.

FIG. 1 illustrates a processing system 100 utilizing a reservation mechanism for inter-thread signaling in accordance with at least one embodiment of the present disclosure. The processing system 100 includes one or more processing devices (e.g., processing devices 102 and 104) and a memory 106 connected via an interconnect 108. Each processing device is configurable to execute one or more threads and is capable of accessing the memory 106 via the interconnect 108. The processing devices can include, for example, processing cores on the same processor, different processors, or a combination thereof. The interconnect 108 can include any of a variety of interconnects, such as a bus, a cross-point switch, a bridge, and the like. In at least one embodiment, the interconnect 108 is configured to communicate memory coherency traffic between the processing devices 102 and 104 and the memory 106.

In the depicted example, the processing device 102 includes an instruction pipeline 110, a cache hierarchy 112, and a coherency agent 114. The processing device 104 may be similarly configured. The instruction pipeline 110 is configured to process instructions associated with one or more threads. In one embodiment, the instruction pipeline 110 includes, among other stages, a thread scheduler 116 and an execution unit 118. The execution unit 118 includes any of a variety of instruction execution components, such as an arithmetic logical unit (ALU), a floating-point unit (FPU), a retire unit, and the like. The thread scheduler 116, in one embodiment, is configured to select and schedule threads for execution by the execution unit 118 based on their relative thread execution priorities or enabled/disabled statuses. The cache hierarchy 112 includes one or more caches, such as an L1 cache, an L2 cache, and the like.

The coherency agent 114 is configured to maintain coherency between the cache hierarchy 112 and the memory 106 via memory transactions transmitted and received via the interconnect 108, where the memory transactions can include store operations, load operations, coherency transactions, and the like. Further, in one embodiment, the coherency agent 114 includes reservation circuitry 120 configurable to set a reservation for a memory address indicated by a reservation indicator 122 from the instruction pipeline 110 or to clear a previously-set reservation on a memory address indicated by the reservation indicator 122. The reservation circuitry 120 can utilize a reservation register 124 to store information associated with a set reservation, including a reservation address field 126 to store at least a portion of the memory address (reserved memory address $R_A$) for which the reservation has been set and a reservation validity field 128 to store a reservation validity indicator (e.g., a bit $R_V$) indicating whether the reservation is currently valid (i.e., whether the value stored at the memory address of the reservation validity field 128 has been detected as unmodified since the reservation was initially set). Although FIG. 1 illustrates a single reservation register 124, it will be appreciated that the reservation circuitry 120 can be configured to maintain more than one reservation at any given time and thus more than one reservation register 124 may be implemented by the coherency agent 114.

To set a reservation, the reservation circuitry 120 stores a provided memory address as a reserved memory address in the reservation address field 126 of the reservation register 124 and sets the reservation validity indicator of the reservation validity field 124 to a value indicating the reservation is valid (e.g., "1"). The reservation circuitry 120 further can set a reservation state indicator 130 to a valid state, thereby indicating that the reservation is valid. Once a reservation has been set by the reservation circuitry 120, the reservation circuitry 120 monitors the reservation to detect whether the reservation remains valid or has been cleared. Likewise, the coherency agent 114 monitors memory transactions being transmitted via the interconnect 108 to identify any memory transactions related to the reserved memory address. A memory transaction related to the reserved memory address can be identified by the coherency agent 114 by, for example, comparing the memory address of the memory transaction with the reserved memory address stored in the reservation address field 126. In the event that the coherency agent 114 detects a memory transaction that modifies the value stored at the reserved memory address, the coherency agent 114 clears the reservation validity indicator (e.g., sets to "0") of the reservation validity field 128, thereby indicating that the reservation is no longer valid. Likewise, other events at the processing device 102 can result in clearing of a valid reservation by clearing the reservation validity indicator, such as the occurrence of an interrupt or the execution of a store-conditional instruction. In response to the clearing of the reservation validity indicator, the reservation circuitry 120 changes the reservation state indicator 130 to an invalid state, thereby indicating that the reservation is invalid.

The processing device 102 is configurable to execute a number of instructions related to the reservation mechanism of the coherency agent 114. These instructions can be embodied in any of a variety of computer readable media, such as, for example, the memory 106, one or more caches of the cache hierarchy 112, at another storage component (e.g., a read-only memory, a hard disk, etc.) or a combination thereof.

One of these instructions includes an instruction to manipulate the processing device 102 to set a reservation for a specified memory address. One example of this instruction is the Load Word and Reserve Index (lwarx) instruction or the Load Double Word and Reserve Index (ldarx) instruction of the IBM PowerPC® User Set Instruction Architecture. The lwarx instruction typically has the syntax: lwarx RT, RA, RB; where RA and RB specify the registers that store values for effective address calculation and RT specifies the register in which the result of the operation is stored. When a lwarx instruction is executed by the processing device 102, the sum of the values stored registers RA and RB forms an effective address which is then translated to a real address by a memory management unit (MMU)(not shown) of the processing device 102. A reservation indicator 122 for the memory address represented by the real address is sent to the reservation circuitry 120, whereupon the reservation circuitry 120 sets a reservation for the specified memory address. Further, as part of the execution of the lwarx instruction, the processing device 102 initiates a load operation to load the value stored at the specified memory address to the register specified by RT. Thus, the lwarx instruction can serve both to set the reservation for a specified memory address as well as to load the current value stored at the specified memory address into a register for use at the processing device 102. The ldarx instruction also may be used in the same manner.

Another reservation-based instruction executable by the processing device 104 includes an instruction to clear a previously-set reservation. One example of this type of instruction is the Store Word Conditional Index (stwcx.) instruction of the IBM PowerPC® User Set Instruction Architecture (whereby the "." following the "stwcx" identifies the instruction as a record form that sets a condition register on the basis of the result of the instruction). The stwcx. instruction typically has the syntax: stwcx. RS, RA, RB; where RA and RB specify the registers that contain values for effective address calculation and RS specifies the register containing data which is stored to a real address determined from the sum of the values in registers RA and RB. When a stwcx. instruction is executed by the processing device 102, the processing device 102 calculates the effective memory address represented by the sum of the values stored in registers RA and RB, translates the effective address into a corresponding real address, and initiates a store operation to store the value in the register RS to the memory 106 at the specified real memory address. Further, during execution of the stwcx. instruction, the instruction pipeline 118 sets the reservation indicator 122 to clear any reservation associated with the specified memory address. In response, the reservation circuitry 120 clears the reservation register 124 and sets the reservation state indicator 130 to an invalid state, thereby clearing the reservation. Thus, the stwcx. instruction can serves both to clear a previously-set reservation as well as to conditionally store a specified value at the specified memory address if the reservation is still valid when the stwcx. instruction is executed.

A third type of reservation-based instruction executable by the processing device 102 includes an instruction that manipulates the processing device 102 to modify the execution state of the thread until a previously set reservation is invalidated. This modification of the execution state can be achieved by an instruction (referred to herein as the "wait on reservation clear" or "waitrc" instruction) that changes the execution state of the thread from an execution enabled state to an execution disabled state (i.e., disabling execution of the thread) until a previously-set reservation is invalidated. Alternately, this modification of the execution state can be achieved by an instruction (referred to herein as the "Memory De-emphasize on Reservation Set" or "mdors" instruction) that manipulates the processing device 102 to change the thread execution priority of the thread to a lower thread execution priority until a previously-set reservation is invalidated.

In one embodiment, the syntax of the waitrc and mdors instructions does not include any operands. Alternately, various operands can be used to modify or control certain aspects of the execution of the waitrc instruction or the mdors instruction. For example, the waitrc instruction or the mdors instruction can include an operand that specifies a maximum timeout period before the execution of the instruction is automatically halted.

When executing a waitrc instruction, the execution unit 118 configures an enable/disable indicator 132 to a disable state indicating that the currently-executing thread is to be disabled from further execution pending clearing or invalidation of the previously-set reservation (or pending receipt of an interrupt at the processing device 102). In response to the enable/disable indicator 132 having the disable state, the thread scheduler 116 ceases scheduling subsequent instructions for the thread for processing at the instruction pipeline 110. Further, the thread scheduler 116 can flush some or all of the instructions of the thread already being processed at the instruction pipeline 110. The thread scheduler 116 then can schedule instructions from another thread for processing at the instruction pipeline 110. Meanwhile, the execution unit 118 monitors the reservation state indicator 130 to detect an invalidation of the previously-set reservation. In at least one embodiment, the execution unit 118 includes circuitry dedicated to monitoring the reservation state indicator 130 without interfering with the operations of other components of the execution unit 118, thereby allowing the execution unit 118 to execute instructions from other threads while monitoring the reservation state indicator 130. In the event that the coherency agent 114 detects a modification to the value at the reserved memory address and the reservation state indicator 130 accordingly is set to indicate an invalidation of the reservation, the execution unit 118 sets the enable/disable signal 132 to an enable state, thereby indicating that the disabled/deprioritized thread can be returned to its original execution state, and the thread scheduler 116 and the execution unit 118 therefore can resume processing of instructions associated with the disabled/deprioritized thread.

The execution of the mdors instruction proceeds in a similar manner. However, rather than disabling execution of the thread outright until the reservation is invalidated or cleared, the execution unit 118 instead sets a prioritize/deprioritize indicator 134 to a deprioritize state, indicating a deprioritization of the thread. The deprioritization can include deprioritizing the thread to a predetermined thread execution priority, by deprioritizing the thread by a predetermined number of priority levels from its original thread execution priority, and the like. The thread scheduler 116 then can schedule instructions from the one or more threads available at the processing device 102 according to the adjusted priority scheme. In this way, the deprioritized thread is not entirely prevented from being executed, depending on the resulting priority of the deprioritized thread. When the execution unit 118 detects an invalidation of the previously-set reservation, the execution unit 118 sets the prioritize/deprioritize indicator 134 to a reprioritize state, thereby signaling to the thread scheduler 116 that the deprioritized thread is to be returned to its original thread execution priority and the instructions of the available threads can be scheduled for execution according to the reinstated priority scheme.

As described in greater detail with reference to FIGS. 2 and 3, these reservation-based instructions can be utilized to implement hardware-based inter-thread signaling that does not require frequent, repeated memory accesses or unnecessary use of a processing device's execution bandwidth. Rather than repeatedly executing a load instruction to periodically poll a predetermined memory address to determine if it has been modified by another thread, the reservation mechanism instead can be used to monitor memory transactions to the reserved memory address. Hardware can be used to monitor for a modification to the reserved memory address without stalling the instruction pipeline 110. A detected modification results in an invalidation of the reservation and thus triggers the reinstatement of a disabled/deprioritized thread that was waiting upon a signal from another thread.

Figure 2:
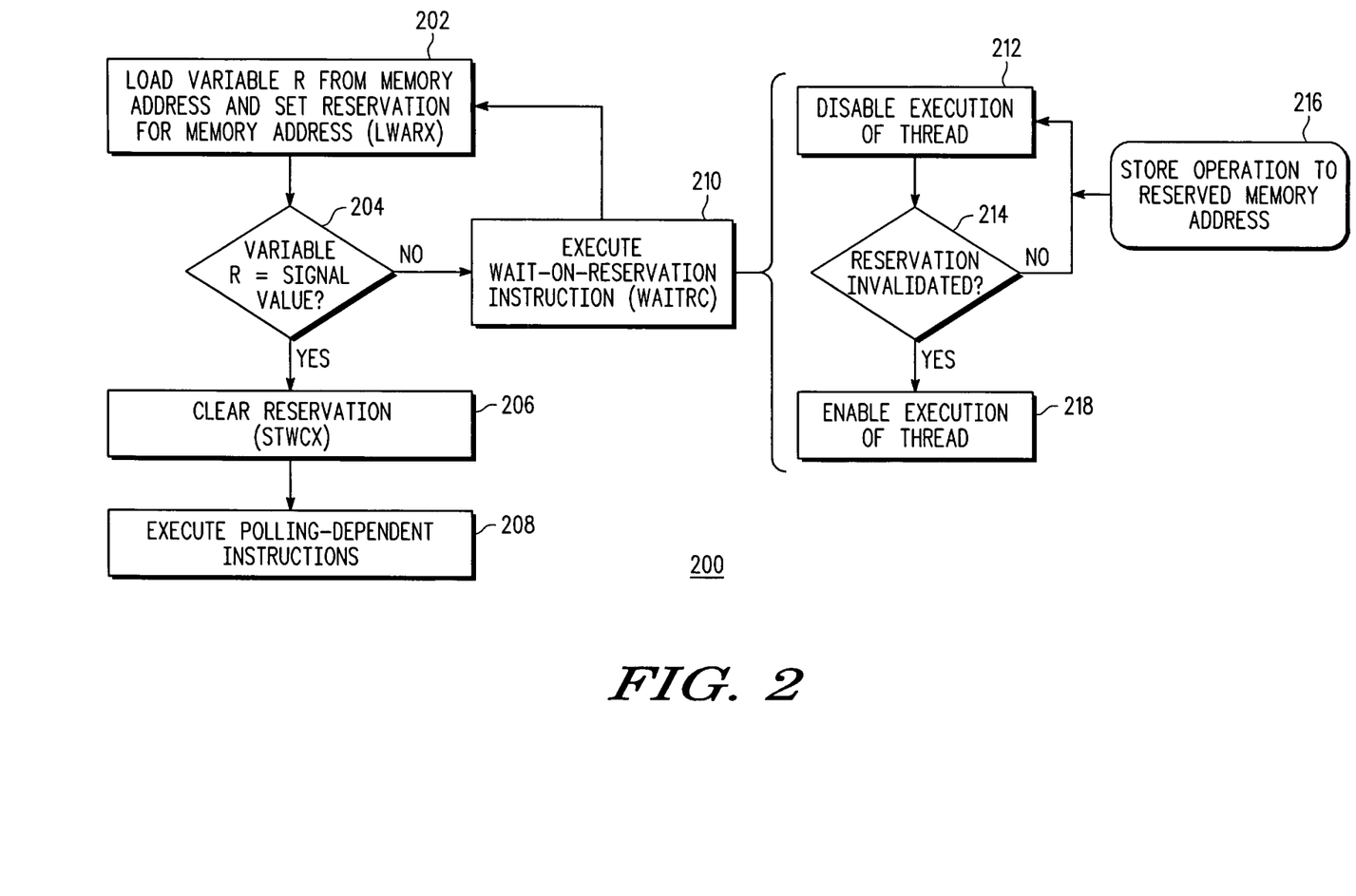
FIG. 2 is a flow diagram illustrating a method for hardware-based polling using a reservation mechanism in accordance with at least one embodiment of the present disclosure.

FIG. 2 illustrates a method 200 for a thread-disabled polling loop implemented at a processing device based on a reservation mechanism in accordance with at least one embodiment of the present disclosure. For ease of discussion, the method 200 is described in the example context of the processing system 100 of FIG. 1.

At block 202, a polling loop for a first thread is initiated during execution of the first thread at the processing device 102. As part of the initialization, the polling loop includes execution of a lwarx instruction or similar instruction that sets a reservation for a specified memory address (i.e., the reservation memory address) that was predetermined as the signal address for a particular signal from a second thread for the first thread. The execution of the lwarx instruction also results in the value at the reserved memory address being stored as a variable R in a specified register.

The polling loop further includes comparing, at block 204, the value of the variable R with a signal value that is specified as the signal from the second thread. In the event that the variable R is equal to the signal value (i.e., the second thread had signaled by writing the signal value to the reserved memory address prior to the load operation at block 202), at block 206 the reservation can be cleared using, for example, a stwcx. instruction of the thread. At block 208, subsequent instructions of the first thread that depend on the successful exit of the polling loop are executed at the processing device 102.

In the event that the variable R is determined to not sufficiently match the signal value at block 204, the polling loop includes the execution of a waitrc instruction at block 210. The execution of the waitrc instruction includes disabling further execution of instructions of the first thread at block 212, as discussed above. The validity of the reservation set at block 202 is monitored in hardware at block 214 until a memory transaction from another thread modifies the value stored at the reserved memory address (event 216), in response to which the reservation is invalidated and the execution of the first thread is reenabled at block 218. While the validity of the reservation is being monitored, instructions from other threads can be executed by the processing device 102. After execution of the first thread is reenabled at block 218, the polling loop returns to block 202 whereupon processes represented by some or all of blocks 204, 206, 208, and 210 are repeated again for the next iteration of the polling loop.

The polling loop represented by method 200 also can be represented by the following instruction sequence of Table 1:

TABLE 1 polling loop using waitrc instruction at first thread

// reserved memory address in register r3
// register r4 is a scratch memory location
// RUNNOW is the predetermined signal from the second thread TABLE 1-continued polling loop using waitrc instruction at first thread

```
// DONTRUN and RUNNOW are different values
// ensure that the reserved memory address initially stores the DONTRUN
value li r1, DONTRUN  // load DONTRUN into the register r1
stw r1,0,r3   // store value of r1 at reserved memory address
loop:
   lwarx r1,0,r3     // get value and set reservation
   cmpi  r1,RUNNOW   // test to see if signal has been stored at reserved
                     memory address
   beq   run         // branch to run if r1 = RUNNOW
   waitrc            // wait until reservation clear or interrupt
   b loop
run:
   stwcx. r1,0,r4    // clear reservation (optional)
   // polling-dependent instructions follow
```

Consistent with the instruction sequence of Table 1, a second thread can signal the first thread by writing the RUNNOW value to the reserved memory address, as illustrated by the instruction sequence of Table 2.

TABLE 2 signaling instruction sequence at second thread

```
// reserved memory address in register r3
li r1,RUNNOW // load RUNNOW into the register r1
stw r1,0,r3 // memory transaction (store) to write the contents of register r1
into the
     // reserved memory address represented by register r3
```

Figure 3:
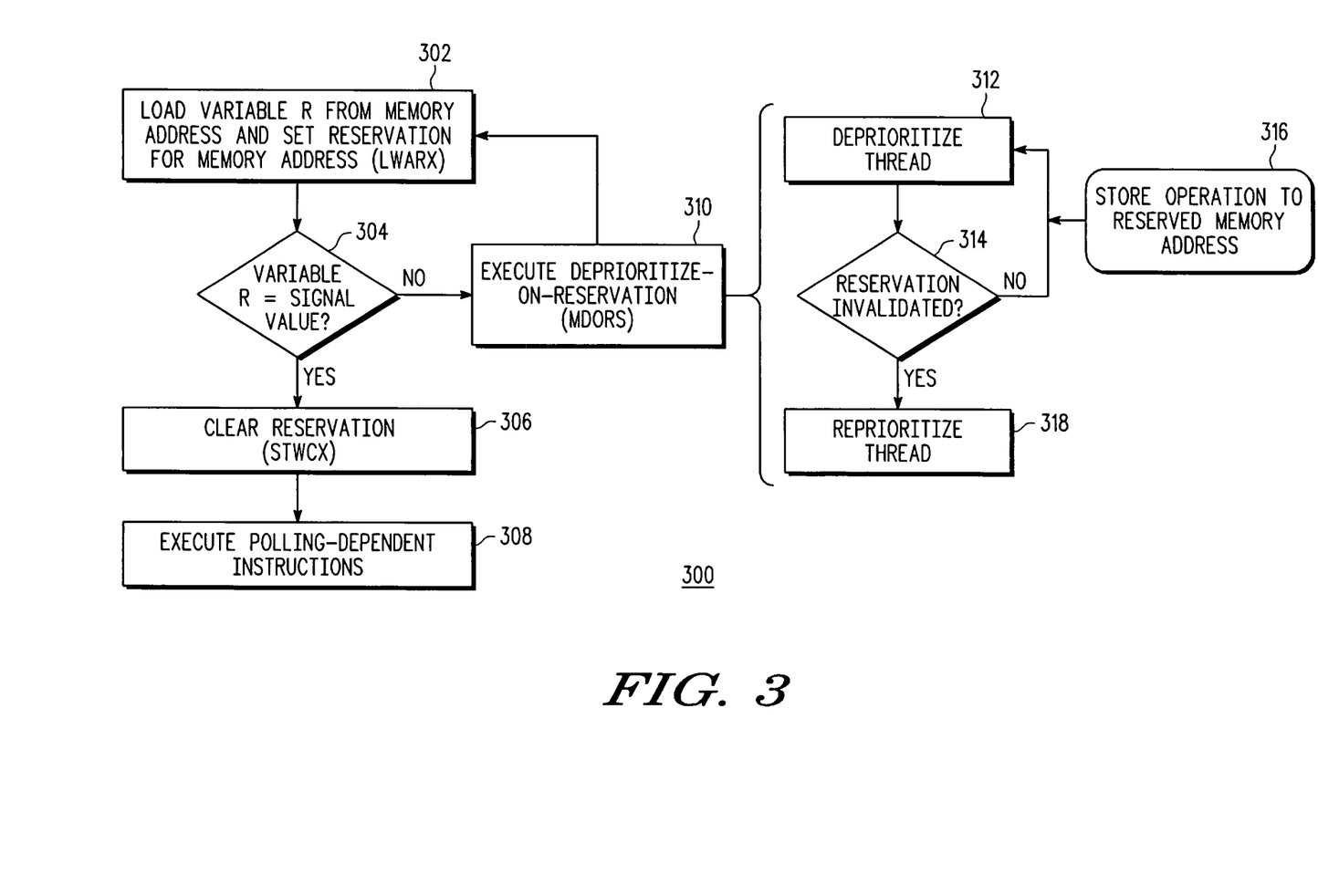
FIG. 3 is a flow diagram illustrating another method for hardware-based polling using a reservation mechanism in accordance with at least one embodiment of the present disclosure.

FIG. 3 illustrates a method 300 for a thread-deprioritizing polling loop implemented at a processing device based on a reservation mechanism in accordance with at least one embodiment of the present disclosure. For ease of discussion, the method 300 is described in the example context of the processing system 100 of FIG. 1.

At block 302, a polling loop for a first thread is initiated during execution of the first thread at the processing device 102. As part of the initialization, the polling loop includes execution of a lwarx instruction or similar instruction that sets a reservation for a predetermined memory address (i.e., the reservation memory address) that was predetermined as the signal address for a particular signal from a second thread for the first thread. The execution of the lwarx instruction also results in the value at the reserved memory address being stored as a variable R in a specified register.

The polling loop further includes comparing, at block 304, the value of the variable R with a signal value that was specified as the signal from the second thread. In the event that the variable R is equal to the signal value (i.e., the second thread had signaled by writing the signal value to the reserved memory address prior to the load operation at block 302), at block 306 the reservation can be cleared using, for example, a stwcx. instruction of the thread. At block 308, subsequent instructions of the first thread that depend on the successful exit of the polling loop can be executed at the processing device 102.

In the event that the variable R is determined to not sufficiently match the signal value at block 304, the polling loop includes the execution of a mdors instruction at block 310. The execution of the mdors instruction includes changing the thread execution priority of the first thread to a lower priority at block 312. The validity of the reservation set at block 302 is monitored in hardware at block 314 until a memory transaction from another thread modifies the value stored at the reserved memory address (event 316), in response to which the reservation is invalidated and the original thread execution priority of the first thread is reinstated at block 318. While the validity of the reservation is being monitored, instructions from other threads can be executed by the processing device 102. The polling loop returns to block 302 whereupon processes represented by some or all of blocks 304, 306, 308, and 310 can be repeated again for the next iteration of the polling loop.

The polling loop represented by method 300 also can be represented by the following instruction sequence of Table 3:

TABLE 3 polling loop using mdors instruction at first thread

```
// reserved memory address in register r3
// register r4 is a scratch memory location
// RUNNOW is the predetermined signal from the second thread
// DONTRUN and RUNNOW are different values
// ensure that the reserved memory address initially stores the DONTRUN
value ldi r1, DONTRUN // load DONTRUN into the register r1
stw r1,0,r3   // store value of r1 into reserved memory address
loop:
   lwarx r1,0,r3      // get value and set reservation
   cmpi  r1,RUNNOW    // test to see if signal has been stored at reserved
   memory address
   beq   run          // branch to run if r1 = RUNNOW
   mdors              // deprioritize until reservation clear or interrupt
   b loop
run:
   stwcx. r1,0,r4     // clear reservation (optional)
// polling-dependent instructions follow
```

Consistent with the instruction sequence of Table 3, a second thread can signal the first thread by writing the RUN-NOW value to the reserved memory address, as illustrated by the instruction sequence of Table 2 above.

Figure 4:
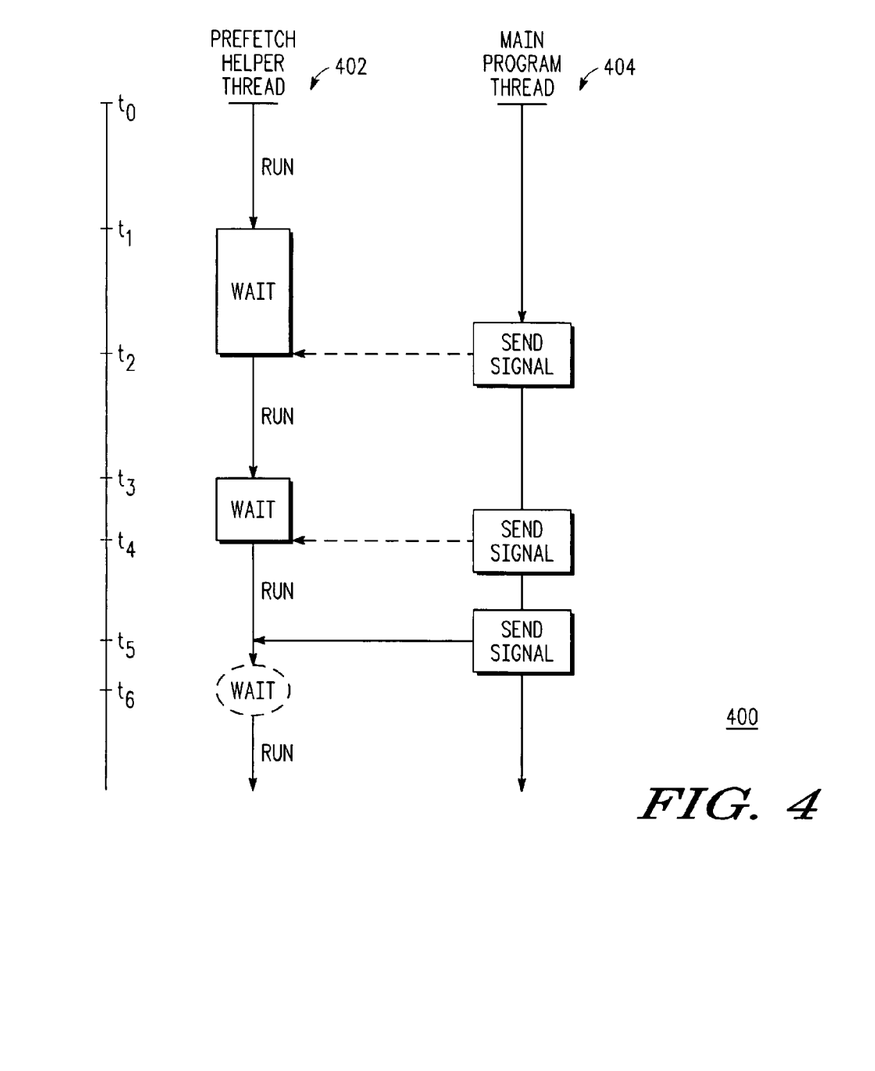
FIG. 4 is a timing diagram illustrating an example execution of a main program thread and a prefetch helper thread using reservation-based signaling in accordance with at least one embodiment of the present disclosure.

FIG. 4 illustrates a timing diagram 400 illustrating example reservation-based inter-processor signaling in accordance with at least one embodiment of the present disclosure.

It often is advantageous to implement a prefetch helper thread to prefetch data into a cache for use by a main program thread. However, care should be taken to ensure that the prefetch helper thread does not advance too far ahead of the main program thread or else the cache is likely to evict the prefetched data. Accordingly, conventional techniques utilize memory-based inter-thread signaling technique whereby the main program thread periodically writes a signal value to a predetermined memory address and the prefetch helper thread periodically utilizes a software polling loop that repeatedly loads the value currently stored at the predetermined memory address to determine whether the signal value has been written by the main program thread, thereby signaling that the prefetch helper thread can prefetch the next set of data. However, this software-based polling loop typically requires many and frequent load operations to the predetermined memory address, thereby reducing memory bandwidth available for other processes and limiting the processing device's ability to process other tasks.

To reduce the number of memory accesses and to free-up processing device resources, in one embodiment, a prefetch helper thread (represented by timeline 402) represents a reservation-based polling/signaling mechanism to identify when a main program thread (represented by timeline 404) has signaled to the prefetch helper thread. At time $t_0$, the prefetch helper thread and the main program thread each begin execution of their respective sequence of instructions. At time $t_1$, the prefetch helper thread initiates a reservation-based polling loop, as described above, to wait for the main program thread to catch up. In this example, the main program thread does not reach its signal instruction until time $t_2$, whereby the main program thread writes a signal value to the reserved memory address, which is snooped and which causes the invalidation of the reservation, thereby signaling to the prefetch helper thread to reload the modified value from the reserved memory address to verify that the signal value has been written to the reserved memory address by the main program thread.

Having thus verified the signal, the prefetch helper thread then resumes prefetching data until time $t_3$, at which point the reservation-based polling loop is again initiated. At time $t_4$, the main program thread writes the signal value to the reserved memory address, thereby signaling to the prefetch helper thread to proceed with prefetching again.

At time $t_5$, the main program thread again reaches a point whereby it signals to the prefetch helper thread by writing the signal value to the predetermined memory address. However, in this example, the prefetch helper thread is not at a polling loop at time $t_5$, and thus at time $t_6$ when it does initiate a reservation-based polling loop, the prefetch helper thread can continue without waiting as the signal value was already set at time $t_5$.

In this manner, the prefetch helper thread and the main program thread can remain synchronized without the use of repeated memory accesses within tight polling loops, thereby freeing up memory bandwidth for other processes. Further, because the prefetch helper thread is disabled (or, alternately, deprioritized) while in the reservation-based polling loops, other threads may be executed in its stead, thereby allowing for improved processor efficiency.

In this document, relational terms such as "first" and "second", and the like, may be used solely to distinguish one entity or action from another entity or action without necessarily requiring or implying any actual such relationship or order between such entities or actions. The terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. The terms "including", "having", or any variation thereof, as used herein, are defined as comprising.

The term "another", as used herein, is defined as at least a second or more. The term "coupled", as used herein with reference to electro-optical technology, is defined as connected, although not necessarily directly, and not necessarily mechanically.

Other embodiments, uses, and advantages of the disclosure will be apparent to those skilled in the art from consideration of the specification and practice of the disclosure disclosed herein. The specification and drawings should be considered exemplary only, and the scope of the disclosure is accordingly intended to be limited only by the following claims and equivalents thereof.

What is claimed is:

1. A method comprising:
  setting, at a processing device, a reservation associated with a memory address;
  executing a first instruction of a first thread at a first execution unit of the processing device, the first instruction including an operand that specifies a maximum period of time to expire before the execution of the first instruction is automatically halted and operable to:
    change an execution state of the first thread from a first execution state to a second execution state in response to determining the reservation is set; and maintain the second execution state at the processing device until an invalidation of the reservation is determined by reservation circuitry of the processing device;

executing instructions of a second thread at the first execution unit while the second execution state is active; and changing the execution state of the first thread from the second execution state to the first execution state at the processing device in response to the reservation circuitry determining the invalidation of the reservation, the determination based on identifying a memory access at a coherency interconnect, the memory access including the memory address.

2. The method of claim 1, wherein:
setting the reservation comprises setting a reservation state indicator to a first state; and
the reservation circuitry determines the invalidation of the reservation in response to a change of the reservation state indicator from the first state to a second state.

3. The method of claim 1, wherein setting the reservation comprises executing a reservation instruction at the processing device to set the reservation.

4. The method of claim 1, further comprising:
monitoring, at the processing device, memory transactions on the coherency interconnect to identify any memory transactions related to the memory address subsequent to setting the reservation; and
invalidating the reservation in response to determining a monitored memory transaction has modified a value stored at the memory address.

5. The method of claim 1, wherein:
the first thread is one of a plurality of threads executed by the processing device;
the first execution state comprises a first thread execution priority; and
the second execution state comprises a second thread execution priority lower than the first thread execution priority.

6. The method of claim 1, wherein:
the first execution state comprises an execution enabled state; and
the second execution state comprises an execution disabled state.

7. The method of claim 1, wherein:
changing the execution state of the first thread from the first execution state to the second execution state comprises disabling execution of the first thread by the processing device; and
change the execution state of the first thread from the second execution state to the first execution state comprises enabling execution of the first thread by the processing device.

8. The method of claim 1, further comprising:
determining to signal the processing device via another processing device subsequent to executing the first instruction at the processing device and while the execution state of the first thread is the second execution state; and
initiating a memory transaction to modify a value stored at the memory address via the other processing device in response to determining to signal the processing device.

9. A system comprising:
a first processing device comprising:
an execution unit to execute a first instruction of a first thread, the first instruction including an operand that specifies a maximum period of time to expire before the execution of the first instruction is automatically halted and operable to:
change an execution state of the first thread from a first execution state to a second execution state in response to an indicator identifying a reservation associated with a memory address is valid; and
maintain the second execution state at the first processing device until the indicator identifies an invalidation of the reservation, wherein the execution unit is operable to execute instructions of a second thread while the second execution state is active; and
reservation circuitry to monitor memory access activity at a coherency interconnect to identify the invalidation of the reservation associated with the memory address, and to configure the indicator based on the identifying.

10. The system of claim 9, wherein the execution unit is further to execute a second instruction of the first thread to set the reservation for the memory address.

11. The system of claim 9, wherein the reservation circuitry further is to monitor memory operations on the coherency interconnect to determine whether the reservation has been invalidated by a memory operation.

12. The system of claim 9, further comprising:
the coherency interconnect operably coupled to the first processing device; and
a second processing device operably coupled to the coherency interconnect, the second processing device to invalidate the reservation by initiating a memory transaction to modify a value stored at the memory address via the coherency interconnect.

13. The system of claim 9, wherein:
the first thread is one of a plurality of threads executed by the processing device;
the first execution state comprises a first thread execution priority; and
the second execution state comprises a second thread execution priority lower than the first thread execution priority.

14. The system of claim 9, wherein the first execution state comprises an execution enabled state; and the second execution state comprises an execution disabled state.

15. A hardware computer readable medium embodying a set of executable instructions to manipulate a processing device, the set of executable instructions comprising:
a first instruction including an operand that specifies a maximum period of time to expire before the execution of the first instruction is automatically halted to:
manipulate the processing device to change an execution state of a first thread associated with the first instruction from a first execution state to a second execution state in response to an indicator identifying a reservation associated with a memory address is valid; and
maintain the second execution state at the first processing device until the indicator identifies the reservation is no longer valid, wherein the invalidation is detected by identifying a memory access at a coherency interconnect, the memory access including a memory address associated with the reservation, and wherein the processing device is operable to execute instructions of a second thread while the second execution state is active.

16. The computer readable medium of claim 15, the set of executable instructions further comprising: a second instruction configured to manipulate the processing device to set the reservation for the memory address.

17. The computer readable medium of claim 15, wherein:
the first execution state comprises a first thread execution priority; and
the second execution state comprises a second thread execution priority lower than the first thread execution priority.

\* \* \* \* \*